US007248744B2

(12) United States Patent
Cockshott (10) Patent No.: US 7,248,744 B2
(45) Date of Patent: Jul. 24, 2007

(54) VECTOR QUANTIZATION OF IMAGES

(75) Inventor: William Paul Cockshott, Lanark (GB)

(73) Assignee: The University Court of The University of Glasgow, Glasgow (GB)

( * ) Notice: Subject to any disclaimer, the term of this patent is extended or adjusted under 35 U.S.C. 154(b) by 776 days.

(21) Appl. No.: 10/221,335

(22) PCT Filed: Mar. 6, 2001

(86) PCT No.: PCT/GB01/00960

§ 371 (c)(1),
(2), (4) Date: Dec. 20, 2002

(87) PCT Pub. No.: WO01/67776

PCT Pub. Date: Sep. 13, 2001

(65) Prior Publication Data

US 2004/0096117 A1 May 20, 2004

(30) Foreign Application Priority Data

Mar. 8, 2000 (GB) .................................... 0005515

(51) Int. Cl.
*G06K 9/46* (2006.01)
*G06K 9/00* (2006.01)

(52) U.S. Cl. .................................................... 382/253

(58) Field of Classification Search ................ 382/173, 382/232, 233, 240, 250, 251, 253; 375/241, 375/240.16, 240.19, 240.22, 240.25; 704/223, 704/225, 230
See application file for complete search history.

(56) References Cited

U.S. PATENT DOCUMENTS

| 4,849,810 | A | * | 7/1989 | Ericsson ................ 375/240.12 |
| 5,086,439 | A | * | 2/1992 | Asai et al. .................... 375/241 |
| 5,490,230 | A | * | 2/1996 | Gerson et al. ............... 704/225 |
| 6,192,335 | B1 | * | 2/2001 | Ekudden et al. ............ 704/223 |
| 6,324,505 | B1 | * | 11/2001 | Choy et al. .................. 704/230 |
| 2002/0039451 | A1 | * | 4/2002 | Bruna et al. ................. 382/251 |
| 2004/0030549 | A1 | * | 2/2004 | Gerlach ....................... 704/230 |
| 2004/0096117 | A1 | * | 5/2004 | Cockshott .................... 382/253 |

OTHER PUBLICATIONS

Bethel, D.M. et al. "Optimal Image Segmentation by Error Diffusion", IPA97, Conference Publication No. 443, pp. 641-644 (Jul. 15-17, 1997).
Chee, Y-K. "Survey of Progressive Image Transmission Methods", International Journal of Imaging Systems and Technology, 10(1):3-19 (1999).
Mukherjee, D. et al. "Vector Set Partioning with Classified Successive Refinement VQ for Embedded Wavelet Image and Video Coding", IEEE, US, Conf. 23: 2809-12 (May 12, 1998).
Said, A. et al. "A New, Fast, and Efficient Image Codec Based on Set Partitioning in Hierarchical Trees," IEEE Transactions on Circuits and Systems for Video Technology, 6(3):243-250 (Jun. 1996).
Wang, L. et al. "Pyramid Transform Coding Using Vector Quantization", IEEE, US, Conf. 13:812-15 (Apr. 11, 1988).

* cited by examiner

*Primary Examiner*—Amir Alavi
(74) *Attorney, Agent, or Firm*—Lahive & Cockfield, LLP (57) ABSTRACT

A method of compressing an image is described in which digital data signals in a 2-dimensional images are formed into an image data pyramid with a number of layers and each layer is processed to give a compressed encoding in an ordered list. The encoding with the largest quality gain factor is selected first and added to a compressed representation of the data array. This is repeated for the next largest gain factor and so on until a predetermined maximum is reached. Each layer of the image data pyramid corresponds to different frequency bands, the vector quantizations of these layers will only minimally interfere with one another. This allows a simple ordering of all possible gain contributions made by the compressed encodings, to the compressed representation. This in turn allows a straightforward selection of the compressed encodings having the largest quality gain factors, for compiling the compressed representation of the image.

10 Claims, 3 Drawing Sheets

VECTOR QUANTIZATION OF IMAGES

The present invention relates to image compression, and in particular to image compression techniques utilising vector quantization of image data.

BACKGROUND OF THE INVENTION

A two-dimensional image, which may for example be an individual image or may be a frame of a video sequence, can conveniently be represented in a computer system as a two-dimensional array of numbers where the numbers encode the brightness of a particular pixel to be displayed on a CRT or other display device. For data compression purposes it is often convenient to represent the array of image data in a more coarsely quantized form. After compression the data is stored in less memory space, but this occurs at the cost of a loss of accuracy. Vector quantization is a well-known enhancement which can be applied to image compression so as to obtain significant reductions in the number of bits required to represent a given image in a computer system.

In vector quantization of a two-dimensional image a codebook of reference patches (e.g. relatively small portions of an image taken from one or more "library" images) is constructed. An image to be compressed is partitioned into a number of image patches and a matching (i.e. similar) reference patch is selected for each patch of the original image, from the codebook. The codebook index for each chosen reference patch in the codebook is stored, together with addressing information (giving the positions of the image patches in the original image) to provide a compressed representation of the image. The chosen codebook index for a patch is often referred to as the "compressed encoding" of the patch. Providing that a copy of the codebook is available, an approximation of the original image can be constructed by using the stored codebook indices to recover the required set of reference patches and inserting these into an image frame using the respective stored image patch position vectors.

WO97/16026 describes an improved vector quantization technique which increases the compression ratio which can be achieved in the compressed image. This technique effectively decides what subdivision will be carried out for individual patches of the original image, when selecting matching reference patches i.e. the size and position of the reference patches from the codebook which will be used to replicate a given patch of the original image. This involves selecting from a plurality of compressed encodings that one of the compressed encodings which, when uncompressed and added to a reference data array, gives the biggest improvement therein relative to the original image data array. The method progressively adds to the reference data array the compressed encodings providing the greatest improvements to the reference array, until a predetermined maximum number of bits are present in the compressed representation, or a desired quality level is achieved in the reference image data array.

One disadvantage of the technique described in WO97/16026 is that there can be interaction between the improvements or "gains" of different patches at different scales, with the result that the image compressor has to repeatedly re-evaluate the gains to be had from different patches. A combinatorial explosion of calculation times would be required to try to calculate the best possible combinations of patches, and this is not practical to implement in the compression apparatus. The technique can therefore result in non-optimal selections of patches. Moreover, the compressed image often has a "blocky" appearance due to discontinuities at the edges of adjacent patches.

It is an object of the present invention to avoid or minimise one of more of the foregoing disadvantages.

SUMMARY OF THE INVENTION

According to one aspect of the present invention we provide a method of compressing an array of data entries in the form of digital electrical signals, the array representing a two-dimensional image, the method comprising the steps of:

(a) forming an image data pyramid from the array of data entries, said pyramid having a plurality of layers, a first and lowermost said layer comprising said array of data entries, and each subsequent higher layer comprising a data array representing the image using less data, and having smaller dimensions, than the previous layer;

(b) processing each layer of the image data pyramid so as to obtain: a set of compressed encodings for each layer, wherein each said compressed encoding can be uncompressed to provide an approximation of a block of image data derived from a respective layer of the image data pyramid; and a respective quality gain factor associated with each said compressed encoding;

(c) creating an ordered list of the compressed encodings, ordered sequentially according to the quality gain factors associated therewith;

(d) selecting the compressed encoding associated with the largest quality gain factor and adding this compressed encoding to a compressed representation of the data array;

(e) selecting the compressed encoding associated with the next largest quality gain factor and adding this compressed encoding to the compressed representation of the original image data array; and (f) recursively repeating step (e) for the remaining compressed encodings until the number of bits in the compressed representation reaches a predetermined maximum.

The compressed representation to which the compressed encoding with the largest quality gain is added the first time step (d) is carried out is an empty data file. As more and more compressed encodings are added to this (initially empty) data file, the number of bits in the data file (and thus in the compressed representation) increases, until finally the predetermined maximum number of bits is reached (this may, for example, be when an area of memory allocated for the data file is full).

Preferably, step (a) comprises forming a non-differential image data pyramid, having layers 0 to n, from the original image data array, and step (b) comprises:

1) define a "current layer number" i and set i=n−1 where n is the topmost (i.e. smallest) layer of the non-differential pyramid;

2) divide layer n of the non-differential pyramid into a grid of blocks which are, preferably, uniformly sized; determine a compressed encoding for each said block in layer n of the non-differential pyramid, wherein the compressed encoding can be uncompressed to provide an approximation of the block; and determine a quality gain factor associated with each said block in layer n of the non-differential pyramid and its respective compressed encoding;

4) replace each block in layer n of the non-differential pyramid with its respective compressed encoding, in uncompressed form, so as to form a current decompressed image at layer n;
5) form an expanded version of the current decompressed image at layer i+1 such that the expanded version has the same dimensions as the pyramid layer i, and subtract this expanded version from the pyramid layer i so as to form a differential pyramid layer i;
6) divide the differential pyramid layer i into a grid of, preferably uniformly sized, blocks; determine a compressed encoding for each said block in the differential pyramid layer i, wherein the compressed encoding can be uncompressed to provide an approximation of the block; and determine a quality gain factor associated with each said block in the differential pyramid layer i and its respective compressed encoding;
7) replace each block in the differential pyramid layer i with its compressed encoding, so as to form a decompressed differential pyramid layer i;
8) add the decompressed differential pyramid layer i to the expanded version of the current decompressed image at layer i+1, to form a current decompressed image at layer i;
9) subtract one from i (i.e. set i to i−1);
10) recursively repeat steps (5) to (9) until the quality gain factors for the lowermost layer (layer 0) of the differential pyramid have been determined.

Alternatively, though not so preferred, step (a) may comprise forming a non-differential image data pyramid from the original image data array, and step (b) may comprise:
1) forming a differential image data pyramid from the non-differential image data pyramid;
2) dividing each layer of the differential image data pyramid into a grid of blocks which are, preferably, uniformly sized, said blocks preferably being the same size on each level of the pyramid;
3) determining a compressed encoding for each block on each layer of the differential pyramid, wherein the compressed encoding can be uncompressed to provide an approximation of the block; and
4) determining a quality gain factor associated with each block on each layer of the differential pyramid and its respective compressed encoding.

The compressed encoding for each said block preferably comprises a codebook index of an entry from a vector quantization codebook, which entry most closely matches the said block. The compressed encoding may additionally include addressing information for the said block specifying the layer of the image data pyramid in which the block is located, and the position vectors defining the position within the layer at which the block is located. Alternatively, and preferably, the compressed encodings are listed in a predetermined order in the compressed representation, such that the position in the original data array (i.e. the address) corresponding to a given encoding determines the position of that encoding in this list. The address for any given encoding can thereby be determined by its position in the list of compressed encodings which makes up the compressed representation.

One advantage of the invention is that because the information at each layer of the image data pyramid corresponds to different frequency bands, the vector quantizations of these layers will only minimally interfere with one another. This allows a simple ordering of all possible gain contributions made by the compressed encodings, to the compressed representation. This in turn allows a straightforward selection of the compressed encodings having the largest quality gain factors, for compiling the compressed representation of the image.

A further advantage of the invention will be appreciated from the following. In some prior art vector quantization techniques for image compression, each block of the original image data array is represented in the computer system as two components: a brightness shift and a codebook entry (i.e. compressed encoding). The brightness shift is added to the codebook entry when reconstructing the image. The advantage of this is that the codebook can be made smaller if it does not have to include the same pattern at a whole range of brightnesses. This speeds up encoding and reduces the memory requirements of the decoder (i.e. decompressor) The disadvantage is that additional information (brightness shift) has to be sent to update each block of the image. In the method of the present invention, at all pyramid levels with the exception of the topmost and thus smallest layer, each block will inherit a background brightness level from the layer above it in the pyramid. The amount of information which must be used to represent each block is thus smaller than in the latter described prior art methods. This, in turn, allows higher compression ratios to be achieved with the present invention, as compared with such prior art methods.

A further benefit of the above-described first and preferred embodiment in which step (b) comprises the above-described steps (1) to (10), is that in that embodiment each lower layer (i) of the pyramid is effectively used to partially compensate for any artifacts introduced by mismatches between the codebook entries and the original blocks of data from the layer above (i+1). There are inevitably artifacts in any codebook based compression scheme where the range of possible variety of the entries in the codebook is less than the range of possible variety of the original data. One artifact that will occur when comparing an enlarged version of a decompressed image as compared to what one would get with simply shrinking and then re-expanding an image is that there will be errors in mean brightness over groups of pixels. Suppose that each layer is half the linear dimensions of the layer below, then a pixel in layer corresponds to 4 pixels in layer i−1. Now if we simply shrunk an image and re-expanded it, this would be equivalent, if we used a naive expansion algorithm, with simply replacing each block of 4 pixels with their average. If the layer above has been vector quantized or otherwise compressed, then the pixel that is expanded to 4 pixels may no longer correspond exactly with the average of the 4 original pixels. Instead, it will have a 'quantization' error. Such quantization errors are artifacts that, subject to availability of bits in the compressed data channel, can be corrected in the vector quantized layer below.

Preferably, the invention also provides a method of decompressing the compressed representation of the image data array obtained in the method according to the above first aspect of the invention, so as to obtain a reconstructed image data array, the decompression method comprising the steps of:
(a) forming a reference image data pyramid, having the same number of layers, 0 to n, and each layer having the same dimensions, as the image data pyramid formed in step
(a) of the above-described method, in which reference pyramid each data entry is preferably set to mid-grey;
(b) using the information in the compressed representation to replace at least some portions of each layer of the reference data pyramid;
(c) defining the topmost (smallest) layer n of the reference data pyramid to be the "current" layer (d) expanding the current layer of the reference data pyramid to match (in dimensions) the layer immediately below the current layer in the reference data pyramid, so as to form an expanded version of said current layer, and adding said expanded version of the current layer to said immediately below layer to form an updated version of said immediately below layer;

(e) defining the updated version of said immediately below layer to be the current layer;

(f) recursively repeating steps (d) and (e) until the updated version of the lowermost layer in the reference data pyramid has been obtained, which updated version of the lowermost layer is the reconstructed image.

An additional advantage of the invention, which will be particularly apparent from the above description relating to the decompression process, is that in the decompressed version of the compressed representation the block boundary artifacts (i.e. blocky appearance) that are often visible when using prior art compression/decompression techniques based solely on block encoding schemes (i.e. without using the image data pyramids according to the present invention) can be avoided as long as suitable interpolation, such as for example linear interpolation, is used during the expansion of the pyramid layers.

According to another aspect of the invention we provide apparatus for compressing an array of data entries in the form of digital electrical signals, the apparatus comprising digital data processing apparatus, conveniently in the form of a computer system set up to run a program embodying the method according to the above-described first aspect of the invention.

According to a third aspect of the invention we provide a computer program product comprising a computer usable medium having computer readable code means embodied in said medium for compressing an array of data entries in the form of digital electrical signals, said computer program product having computer readable code means for carrying out the described steps of the method according to the first aspect of the invention.

BRIEF DESCRIPTION THE DRAWINGS

Preferred embodiments of the invention will now be described, by way of example only and with reference to the accompanying drawings in which.

DETAILED DESCRIPTION

Figure 1:
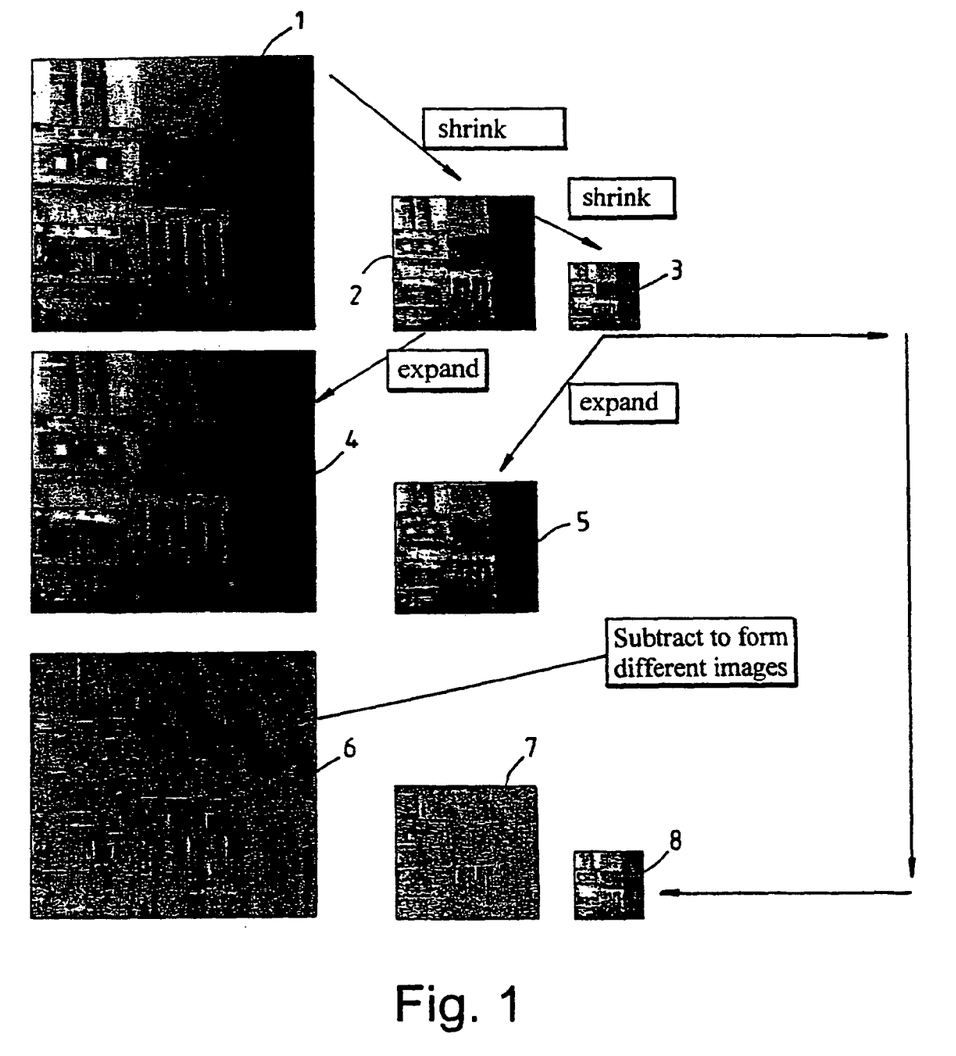
FIG. 1 illustrates the process of forming a differential image pyramid from a non-differential image pyramid.

It will be understood that the images shown in FIG. 1 are digital images which are each represented, in digital image processing, by a two-dimensional array of data entries, each data entry representing the digital electrical signal at one pixel in a two-dimensional pixel array which displays the image. It will further be generally understood that in the below-described image processing methods it is the arrays of data entries representing each image which are operated on as described.

Uppermost in FIG. 1 is a non-differential image pyramid having three layers 1,2,3. The lowermost layer 1 is an original image obtained, for example, as a still frame from a video camera. This original image is used to form the two smaller image layers 2, 3, by first effectively shrinking the original image to form a half-scale image at the next layer 2 up in the pyramid, which next layer up is then itself shrunk to produce an image at the uppermost (topmost) layer 3 of the pyramid. The topmost layer of the pyramid is quarter-scale in size, relative to the original image (the lowermost layer 1). The larger images in the pyramid contain information that is not present in the smaller ones. The formation of such image pyramids is well known in the arts of computer vision and image processing, and one technique is described, for example, in "Structured Computer Vision, S Tanimoto & A Klinger, Academic Press 1980. Various techniques are nevertheless known for forming a non-differential image pyramid and any of these may be used to form the pyramid of FIG. 1.

Figure 2:
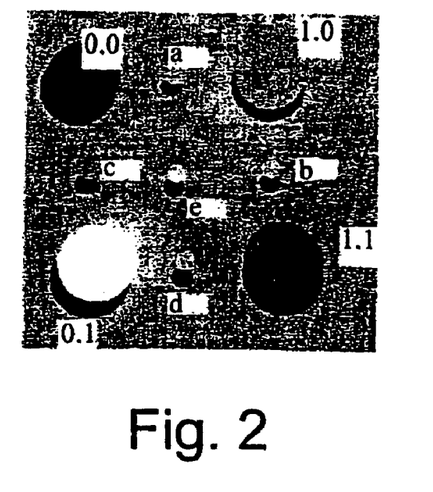
FIG. 2 illustrates a linear interpolation technique.

Lowermost in FIG. 1 are three image layers 6,7,8 in a differential image pyramid formed from the non-differential image pyramid layers 1,2,3. The full and half scale images in the differential pyramid are formed by subtracting enlarged versions 4,5 of the half and quarter scale images (i.e. the two uppermost layers 2,3 are enlarged to full and half scale size respectively) from the full and half scale images (the two lowermost layers 1,2) respectively in the non-differential image pyramid, as illustrated in FIG. 1. When enlarging the image from one layer to another, some appropriate smoothing interpolation is performed, for example a bi-linear or bi-cubic interpolation. Bi-linear interpolation, where interstitial pixels are formed as the average of the pixels which surround them, is illustrated in FIG. 2 in which the large circles with labelled co-ordinates represent pixels in an image of size N and the small circles represent the pixels in an image of size (2N)–1 that are derived from them by bilinear interpolation when the image in layer of size N is expanded to twice its size. Thus small circle a is the average of pixels (0,0) and (1,0), b is the average of pixels (1,0) and (1,1) whilst e is the average of all of the larger pixels.

The topmost layer 8 in the differential pyramid is the same image as the topmost layer of the non-differential pyramid. Again, the processes for forming differential pyramids are well known in the computer vision arts, and are described for example in the above-mentioned reference "Structured Computer Vision". It should be noted that the difference images (i.e. the two lowermost layers 6,7) in the differential pyramid contain information up to a certain frequency. This is the same frequency for the two difference images and will in general be in the range between the Nyquist limit to just above half the Nyquist limit for the scale at which they are represented. Since each image is half the size of the previous one, this means that each contains information corresponding to roughly half the frequency of the previous one. (The information will not be at exactly half the frequency since the process of expanding the smaller image before subtracting it from a larger one may introduce artifacts in frequency space.)

FIRST EMBODIMENT OF THE COMPRESSION METHOD

Figure 3:
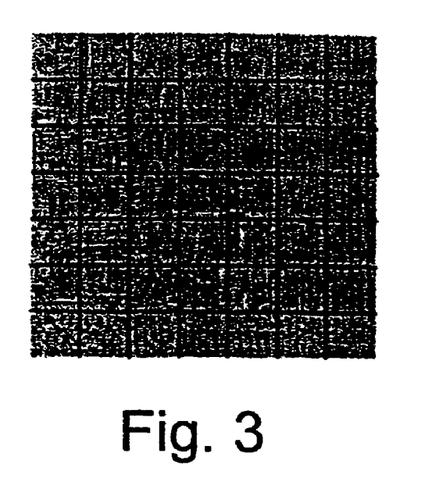
FIG. 3 illustrates a differential image divided into a grid of square blocks.

We now propose an improved process for the vector quantization of video data using the above-described pyramids. The method steps are as follows:

1. Form a non-differential image pyramid from an original video image (as described above);
2. Convert this to a differential image pyramid (as described above);
3. Divide each layer of the differential pyramid into a grid of uniform sized rectangular "patches" as shown in FIG. 3. The patches are the same size on each layer of the pyramid. In the embodiment illustrated in FIG. 3, a differential pyramid image layer is shown divided into a grid of 7×7 square patches.
4. For each patch in each layer determine the codebook entry, from a vector quantization codebook, that best matches it;
5. For each patch and its corresponding vector quantization codebook entry determine the quality gain G as follows:

$$G = \sum_{i=0}^{n} \sum_{j=0}^{n} (P_{ij})^2 - \sum_{i=0}^{n} \sum_{j=0}^{n} (P_{ij} - C_{ij})^2$$

Where Pij stands for the pixels in the patch and Cij the corresponding pixels in the codebook entry. This can also be represented as: G=S–R where $$S = \sum_{i=0}^{n} \sum_{j=0}^{n} (P_{ij})^2$$

represents the total energy of the image within the patch, and $$R = \sum_{i=0}^{n} \sum_{j=0}^{n} (P_{ij} - C_{ij})^2$$

represents the energy of the residual error within the patch after it has been subjected to the compression and decompression process. Thus, the total gain G is G=S–R i.e. gain G is the source energy S minus residual error. It will be appreciated that this gain measure G is based upon the squared error values since we are assuming that pixels are represented as signed real numbers with 0 representing mid gray. The codebook indices for each patch and the associated gains G are stored in memory locations reserved therefore in a single general purpose memory bank used for all the data which needs to be stored permanently or temporarily.

Figure 4:
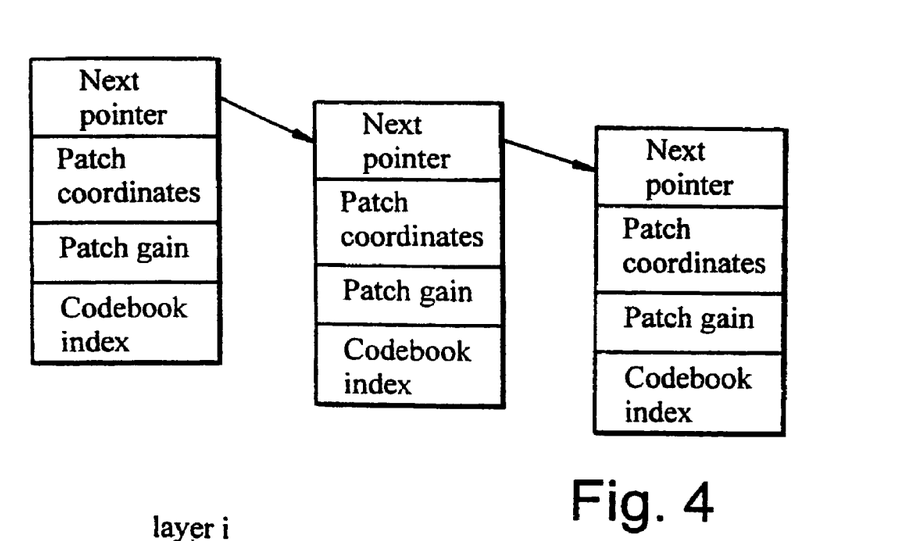
FIG. 4 illustrates an ordered list stored in a memory.

6. Form an ordered list of the patches based upon their associated gains, as illustrated in FIG. 4, the list being ordered such that the patches are sequentially ordered according to ever decreasing gain, with the patch having highest gain G being first in the list. Techniques for forming such lists are well known. See, for example, "Fundamental Algorithms", D. Knuth, Addison Wesley publishing 1975.
7. Add the codebook index for the patch having the highest gain G, along with appropriate addressing information of the patch, into an empty data file, thereby forming an initial compressed representation of the original image. The addressing information specifies the layer of the pyramid and the co-ordinates (i.e. position co-ordinates) within the layer at which the patch occurs. We refer to the chosen codebook index for the patch as the "compressed encoding" of the patch;
8. Continue to add the compressed encodings for the patches successively lower in the ordered list (i.e. according to decreasing gains G) to the compressed representation data file until the number of bits in the compressed representation reaches some pre-determined limit set by the compression ratio.

Methods for creating codebooks and searching them are well known in the art. The technique used in the present invention in this regard are the same as those used and described in WO97/16026.

The Decompression Method

To decode the compressed representation we proceed as follows.

1. Form an image pyramid of the appropriate size (i.e. same number of layers and size of layers as used in the compression method) all of whose pixels on all of whose layers are set to mid grey (0 in the present embodiment)
2. Using the information in the compressed representation replace each patch in the pyramid for which there is a compressed encoding in the compressed representation with the corresponding code book entry.
3. Take the topmost layer of the pyramid, expand the image in size until it is the same size as the layer below.
4. Arithmetically add each pixel in the newly expanded topmost layer to the corresponding pixel in the second from top layer, placing the result of the addition in the corresponding pixel in the second from top layer.
5. Delete the topmost layer of the pyramid, so that the formerly second from top layer becomes the top layer.
6. Repeat steps 3 to 5 until there is only a single layer left in the pyramid. This is then the reconstructed image.

SECOND AND PREFERRED EMBODIMENT OF COMPRESSION METHOD

In a second and preferred embodiment of the invention, the method for compressing an original video image has the following steps:

1. Form a non-differential image pyramid with layers 0 to n, where n is the topmost, and therefore smallest, layer of the pyramid.
2. Allocate a buffer to hold the current representation of the decompressed image, call this buffer B.
3. Allocate a buffer to hold the current differential pyramid layer, in uncompressed form (i.e. not ever compressed and then decompressed), and call this buffer C.
4. Allocate a buffer to hold the current decompressed "differential" pyramid layer, call this buffer D.
5. Allocate a register to hold the current layer number, i, call this register i, and initialise this to i=n–1
6. Copy into C layer n of the pyramid.
7. Divide layer n in C into a grid of uniformly sized rectangular "patches" and for each patch in C find the best matching codebook entry and calculate the gain G associated therewith, using the same formula for the gain G as in step (5) of the first compression method, described above Then place the co-ordinates of this patch, the codebook index for the best matching codebook entry, and the associated gain G calculated therefor, in an empty data file the contents of which will become an ordered list as in step (6) of the first compression method as described above.

8. Place into buffer D a decompressed image formed by replacing each patch in C with the corresponding code book entry (i.e. the best matching codebook entry found therefor in step 7).
9. Copy contents of buffer D into buffer B.
10. If the current layer number i in register i is less than zero go to step 17.
11. Expand the image in B until it is the same size as the image in layer(i), using an appropriate interpolation technique as before, and placing the expanded result back in buffer B.
12. Subtract image B from layer(i) and store the result in buffer C.
13. Divide the image in buffer C into a grid of uniformly sized rectangular patches of the same size as in step 7 above; for each patch in C find the best matching codebook entry, and calculate the gain G associated therewith using the same formula as before; and place the coordinates of this patch, the codebook index of the best matching codebook entry therefor, and the associated gain G therefor, in the ordered list started in step 7 above.
14. Place into buffer D an image formed by replacing each patch in C with the corresponding codebook entry.
15. Add buffer D to buffer B.
16. Subtract 1 from register i and go to step 10.
17. Traverse the ordered list of codebook indices (ordered according to decreasing gain G), placing the codebook indices having the highest gains G into an empty data file, sequentially in order of decreasing gain G (thereby creating a compressed representation of the original image, of increasing bit size) until the data file (and hence the compressed representation) is of a predetermined size (i.e. number of bits).

In either of the above-described compression methods, the codebook indices for the selected patches of high gain G are placed in the compressed representation data file in a predetermined order according to the respective addressing co-ordinates associated therewith. In this manner it is not necessary to also store the addressing co-ordinates in the compressed representation itself: the order of the codebook indices (these are the "compressed encodings" for the related patches) gives the required addressing information for each compressed encoding.

Figure 5:
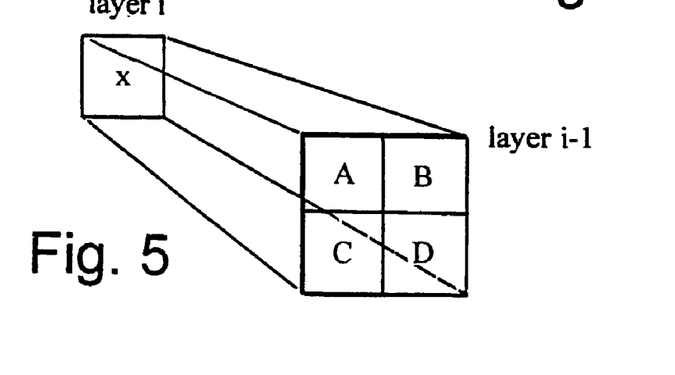
FIG. 5 illustrates schematically two adjacent layers of an image pyramid.

The compressed representation of the original image is thus made up of a series of "codewords", each codeword consisting of a compressed encoding of a patch. This predetermined order in which the compressed encodings are listed can be chosen from a number of possible orders. For example, the compressed encodings can be stored in "layers" i.e. all the encodings for one layer, followed by all the encodings for the next layer etc. Alternatively, the encodings may be stored recursively, as follows:

Assume that we are considering a local region x on layer i of the image pyramid such that region x can be compressed with a single vector quantization codeword. We denote the vector quantization codeword for x as CodeWord(x). Suppose further that for all $i \geq 1$ on layer (i−1), that is to say, the layer immediately below layer i on the image pyramid, the region of the image that corresponds to the region x on layer i, is composed of a rectangle of subregions A, B, C, D as shown in FIG. 5.

The codeword sequence generated for region x and all regions below it in the pyramid we denote by CodeSeq(x). We define it as follows:

if x is on the lowest layer of the pyramid then codeseq (x)=CodeWord (x), otherwise
CodeSeq (x)=CodeWord (x) CodeSeq (A) CodeSeq (B) CodeSeq (C) Codeseq (D)

A recursive order of this type is likely to be preferred where runlength encoding is to be employed in the data handling. However, other suitable orders could alternatively be used, with or without runlength encoding methods.

To decompress the compressed representation in order to obtain the reconstructed image, the same decompression method (steps 1 to 6) is used as already described above.

It will be appreciated that the advantage of the second and preferred compression method is that each lower layer of the pyramid is able to partially compensate for artifacts (i.e. errors) introduced by mismatches between the chosen codebook entries and the associated original rectangles (patches) in the layer above, by performing the encode/decode process at the layer above and taking the result into account when obtaining the compressed encodings for the layer below.

When the bandwidth for the compressed representation is restricted, then vector quantization data for only a subset of all the possible patches in the pyramid will be stored in the compressed representation e.g. a subset consisting of the chosen encodings having highest gain, as described above. In this case it is still possible to use the position of a codeword in the compressed representation to provide implicit addressing information for that codeword. However, in this case the above-described method for recursively storing the compressed encoding is modified so that CodeSeq(x) is now defined as:

if the compressed representation contains no codebook index for position x and there are no codebook indices for positions below x in the pyramid then output bit 0;

if the compressed representation contains no codebook index for position x but it does contain information for one or more of the positions in the pyramid below position x then output bits 10 followed by CodeSeq(A) CodeSeq(B) Codeseq(C) CodeSeq(D);

if the compressed representation contains a codebook index for position x in the pyramid then output bits 11 followed by CodeWord(x) CodeSeq(A) CodeSeq(B) Codeseq(C) CodeSeq(D).

Figure 6:
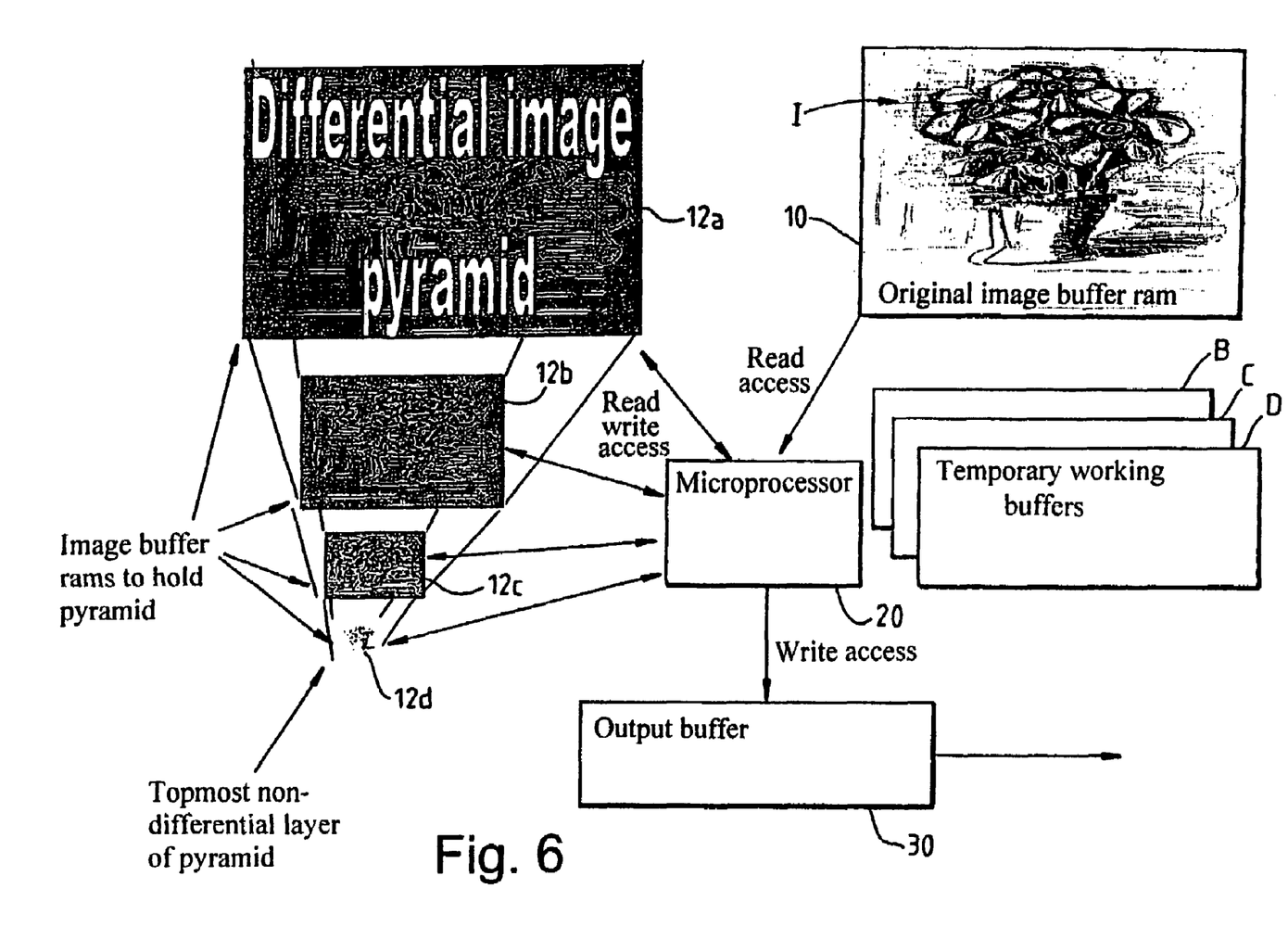
FIG. 6 is a schematic diagram illustrating an image compression system according to one embodiment of the invention.

Apparatus for carrying out the above-described first embodiment of the compression method is illustrated schematically in FIG. 6 which shows the original image I stored in a first buffer RAM 10. A microprocessor 20 programmed to carry out all the image data processing operations has read access to the first buffer RAM 10 and has read and write access to a series of image buffer RAMS 12a, 12b, 12c, 12d for storing the differential image pyramid layers respectively (FIG. 6 illustrates the case where there are four layers in the differential image pyramid, the top-most layer consisting of the original image I). The microprocessor 20 also has write access to an output buffer 30 into which the compressed representation of the original image is stored. In the second and preferred embodiment of the compression method described above, the image buffer RAMs 12a,12b,12c,12d are used for storing the layers of the non-differential image pyramid and the microprocessor 20 also has read and write access to three temporary working buffers B, C, D (shown in broken line) which are the buffers allocated to hold the current representation of the decompressed image, the current differential pyramid layer, and the current decompressed differential pyramid layer, respectively (see steps 2, 3 and 4 of the second and preferred method).

It will be appreciated that various modifications to the above-described embodiments are possible without departing from the scope of the invention. For example, pyramids having more than three layers could be used. In practice we envisage that approximately ten pyramid layers will be provided.

It will also be appreciated that the feature of storing the compressed encodings in the compressed representation in a predetermined order which is used to indicate the addressing information for each encoding is best suited for compression applications where full image frames are continually being compressed, sent, received and decompressed e.g. in high bandwidth video. However, where only a portion of a full frame is changing/being updated (e.g. in low bandwidth video) it is likely to be preferable to send particular addressing information for the compressed encodings relating to the changing/updated image portion. In this case, therefore, the compressed representation may also contain the addressing co-ordinates for some or all of the compressed encodings therein.

Furthermore, while in general the use of patches of uniform size and shape throughout the image pyramids is preferred in order to keep the size (i.e. no. of entries) of the codebook to a minimum, patches of different size and/or shape could be used at different layers, or even within a layer, of the pyramid (this would necessarily require a larger codebook). Moreover, it may be desirable to choose the shape of the patches to match the shape of the original image e.g. rectangular patches for a rectangular image. However, one could alternatively first change the shape of the original image (e.g. from rectangular to square) and then use a desired shape of patches (e.g. square).

Where the images are colour images it will be preferable to send all the colour data (e.g. red, green and blue components) adjacently (i.e. in immediate succession) for each pixel, rather than sending e.g. all red components for all pixels, all green components for all pixels, all blue components for all pixels. Thus, for colour images we assume that each image layer within the pyramid is made up of three planes holding the three respective colour components of the image. These can be either red, green, blue or some other suitable tristimulus encoding of colour data. We define CodeWord(X) to be given by the sequence CodeWord(Xr) CodeWord(Xg) CodeWord(Xb)

Where Xc with c ranging over the set {r, g, b} stands for one of the different colour planes that corresponds to region X of the layer.

The invention claimed is:

1. A method of compressing an array of data entries, the array representing a two-dimensional image, the method comprising the steps of:
   (a) forming an image data pyramid from the array of data entries, said pyramid having a plurality of layers, a first and lowermost layer of said layers comprising said array of data entries, and each subsequent higher layer comprising a data array representing the image using less data, and having smaller dimensions, than the previous layer;
   (b) processing each layer of the image data pyramid so as to obtain: a set of compressed encodings for each layer, wherein each said compressed encoding can be uncompressed to provide an approximation of a block of image data derived from a respective layer of the image data pyramid; and a respective quality gain factor associated with each said compressed encoding;
   (c) creating an ordered list of the compressed encodings, ordered sequentially according to the quality gain factors associated therewith;
   (d) selecting the compressed encoding associated with the largest quality gain factor and adding this compressed encoding to a compressed representation of the data array;
   (e) selecting the compressed encoding associated with the next largest quality gain factor and adding this compressed encoding to the compressed representation of the original image data array; and
   (f) recursively repeating step (e) for the remaining compressed encodings until the number of bits in the compressed representation reaches a predetermined maximum.

2. A method as claimed in claim 1 wherein the compressed representation to which the compressed encoding with the largest quality gain is added the first step (d) is carried out is an empty date file.

3. A method as claimed in claim 1 wherein step (a) comprises forming a non-differential image data pyramid, having layers 0 to n, from the original image data array, and step (b) comprises:
   1) defing a current layer number i and setting i=n−1, where n is the topmost layer of the non-differential pyramid;
   2) dividing layer n of the non-differential pyramid into a grid of uniformly sized blocks determining a compressed encoding for each said block in layer n of the non-differential pyramid, wherein the compressed encoding can be uncompressed to provide an approximation of the block; and determining a quality gain factor associated with each said block in layer a of the non-differential pyramid and its respective compressed encoding;
   3) replacing each block in layer n of the non-differential pyramid with its respective compressed encoding, in uncompressed form, so as to form a current decompressed image at layer n;
   4) forming an expanded version of the current decompressed image at layer i+1 such that the expanded version has the same dimensions as the pyramid layer i, and subtract this expanded version from the pyramid layer i so as to form a differential pyramid layer i;
   5) dividing the differential pyramid layer i into a grid of uniformly sized blocks; determining a compressed encoding for each said block in the differential pyramid layer i, wherein the compressed encoding can be uncompressed to provide an approximation of the block; and determining a quality gain factor associated with each said block in the differential pyramid layer i and its respective compressed encoding;
   6) replacing each block in the differential pyramid layer i with its compressed encoding, so as to form a decompressed differential pyramid layer i;
   7) adding the decompressed differential pyramid layer into the expanded version of the current decompressed image at layer i+1, to form a current decompressed image a layer i;
   8) subtracting one from i;
   9) recursively repeating steps (5) to (9) until the quality gain factors for to lowermost layer of to differential pyramid have been determined.

4. A method as claimed in claim 1 wherein step (a) comprises forming a non-differential image data pyramid from the original image data array, and step (b) comprises;
   1) forming a differential image data pyramid from the non-differential image data pyramid;
   2) dividing each layer of the differential image data pyramid into a grid of uniformly sized blocks, said blocks being the same size on each level of the pyramid;
   3) determining a compressed encoding for each block on each layer of the differential pyramid, wherein the compressed encoding can be uncompressed to provide an approximation of the block; and
   4) determining a quality gain factor associated with each block on each layer of the differential pyramid and its respective compressed encoding.

5. A method as claimed in claim 1 wherein the compressed encoding for each block comprises a codebook index of an entry from a vector quantization codebook, which entry most closely matches the said block.

6. A method as claimed in claim 1 wherein the compressed encoding additionally includes addressing information forte said block specifying the layer of the image data pyramid in which the block is located, and the position vectors defining the position within the layer at which the block is located.

7. A method as claimed in claim 1 wherein the compressed encodings are listed in a predetermined order in the compressed representation, such that the position in the original data array corresponding to a given encoding determines the position of that encoding in this list.

8. A method of decompressing the compressed representation of the image data array obtained in the method according to claim 1, so as to obtain a reconstructed image data array, the decompression method comprising the steps of:

(a) forming a reference image data pyramid, having the same number of layers, 0 to n, and each layer having the same dimensions, as the image data pyramid formed in step (a) of claim 1, in which reference pyramid each data entry is set to mid-grey;
(b) using the information in the compressed representation to replace at least some portions of each layer of the reference data pyramid;
(c) defining the topmost layer n of the reference data pyramid to be the current layer;
(d) expanding the current layer of the reference data pyramid to match the dimensions of the layer immediately below the current layer in the reference data pyramid, so as to form an expanded version of said current layer, and adding said expanded version of the current layer to said immediately below layer to form an updated version of said immediately below layer;
(e) defining the updated version of said immediately below layer to be the current layer;
(f) recursively repeating steps (d) and (e) until the updated version of the lowermost layer in the reference data pyramid has been obtained, which updated version of the lowermost layer is the reconstructed image.

9. Apparatus for compressing an array of data entries, the apparatus comprising digital data processing apparatus, in the form of a computer system set up to run a program embodying the method according to claim 1.

10. A computer program product comprising a computer usable medium having computer readable code means embodied in said medium for compressing an array of data entries, said computer program product having computer readable code means for carrying out the described steps of the method according to claim 1.

* * * * *